Oct. 2, 1923.
W. N. HARTSHORN
CANDY MAKING MACHINE
Filed Nov. 15, 1920
1,469,316
2 Sheets-Sheet 1
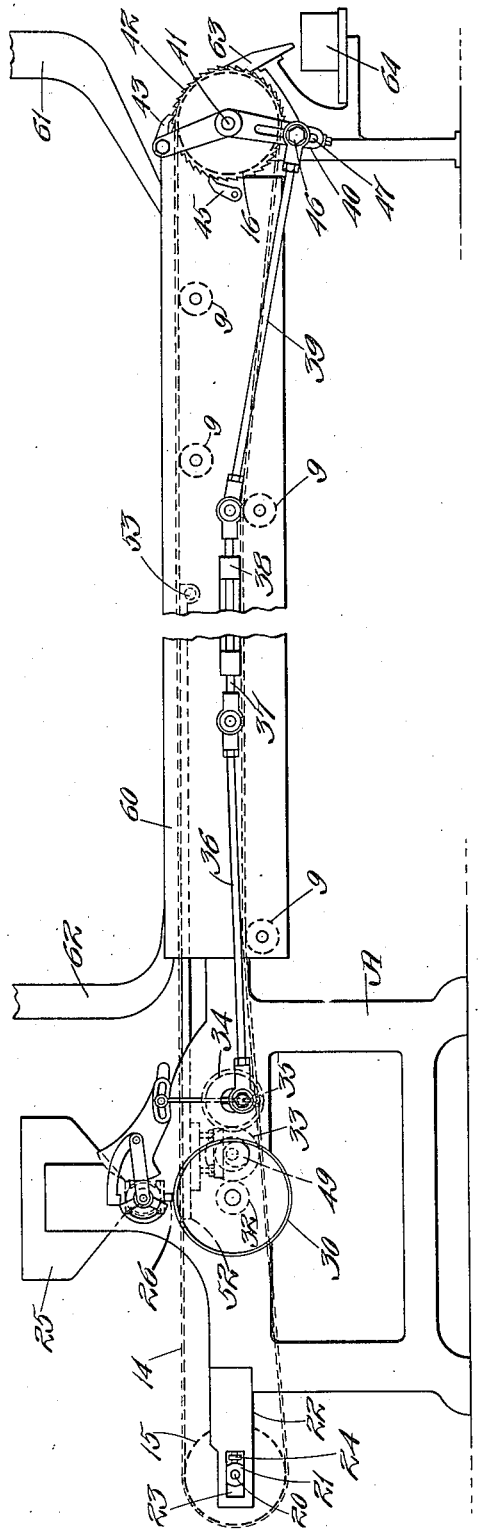
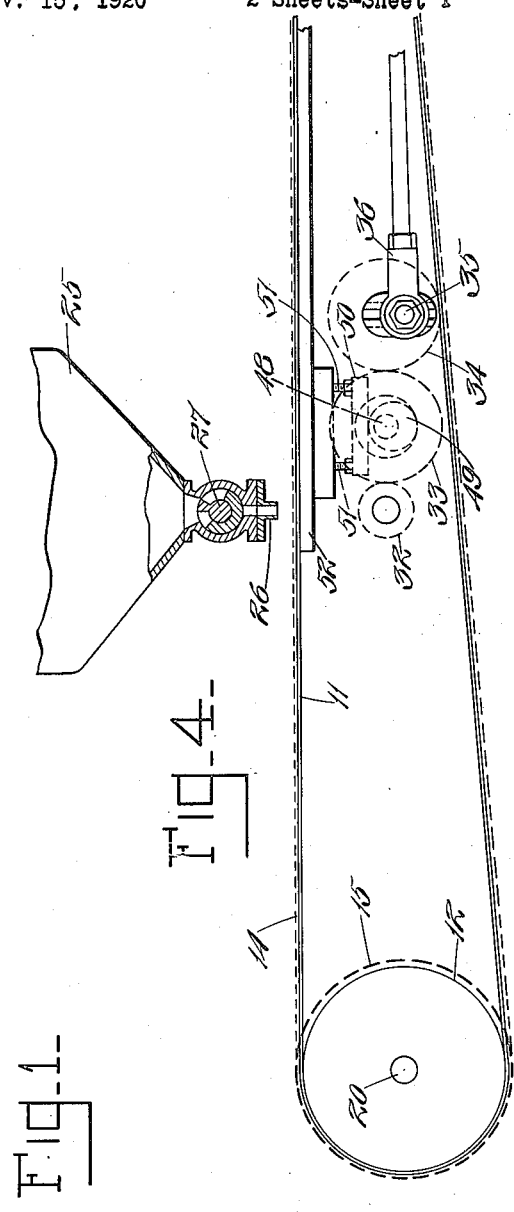
INVENTOR:
Willis N. Hartshorn
by Macleod, Calver, Copeland & Dike
Attys.

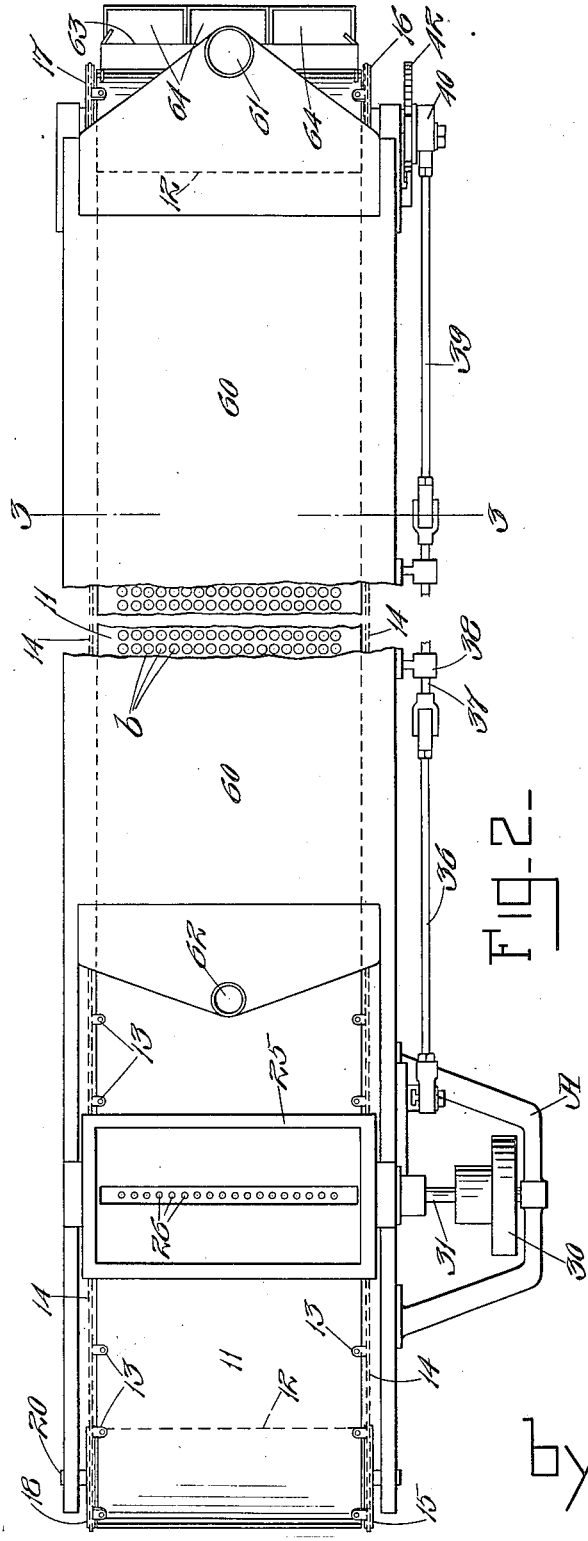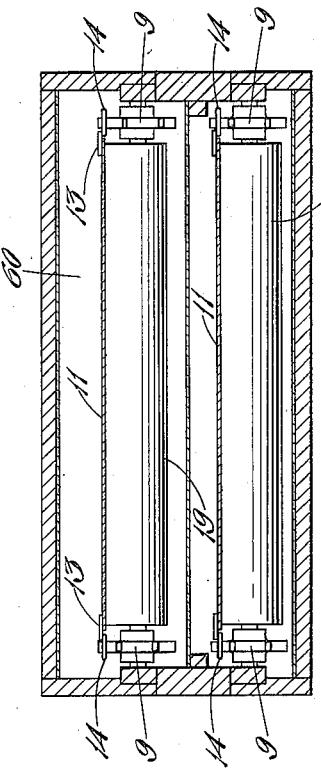

Patented Oct. 2, 1923.

1,469,316

UNITED STATES PATENT OFFICE.

WILLIS N. HARTSHORN, OF RACINE, WISCONSIN, ASSIGNOR TO RACINE CONFECTIONERS' MACHINERY COMPANY, OF RACINE, WISCONSIN, A CORPORATION OF WISCONSIN.

CANDY-MAKING MACHINE.

Application filed November 15, 1920. Serial No. 424,013.

*To all whom it may concern:*

Be it known that I, WILLIS N. HARTSHORN, citizen of the United States, residing at 2351 Carmel Ave., Racine, county of Racine, State of Wisconsin, have invented a certain new and useful Improvement in Candy-Making Machines, of which the following is a specification, reference being had therein to the accompanying drawings.

My present invention relates to a machine for the manufacture of candy, chocolates, small cookies or cakes, which can be formed from liquid or plastic material and hardened by cooling, drying or baking. Although applicable to a variety of other uses, the machine is designed particularly for the manufacture of chocolate buds or stars from a melted chocolate compound which hardens on cooling. Accordingly, I have shown and described my invention as embodied in a machine intended for this purpose, but do not limit myself to this particular use. The machine performs automatically the continuous manufacture of the goods and deposits them in boxes ready for shipment. It, therefore, produces the goods very rapidly and at a minimum expense.

In the accompanying drawings, there is shown an endless belt or apron composed of smooth, burnished metal in combination with mechanism known as a depositor for depositing the chocolate in predetermined amounts on the belt. I believe myself to be the first to employ a polished or burnished metal belt for this purpose and in this combination, and therefore, intend to claim the same broadly. The polished metal belt gives to the goods a smooth, lustrous appearance. It does not adhere to the goods, so that the goods may be automatically removed from the apron after cooling. It assists in the heat distribution and, therefore, aids in cooling. These facts make possible the use of an endless belt in this combination which would otherwise be out of the question.

In the drawings, I have shown a chocolate depositor. Machines of this kind are well known in the art and may be purchased in the open market. For further details of the construction, reference may be made to the patent to J. M. Demerath, No. 791,611, June 6, 1905, which shows a machine of this kind.

The invention will be fully understood from the following description when taken in connection with the accompanying drawings, and the novel features thereof will be pointed out and clearly defined in the claims at the close of this specification.

In the drawings, Figure 1 is a side elevation of a machine embodying my invention.

Fig. 2 is a top plan view of the machine shown in Fig. 1.

Fig. 3 is a section on line 3—3 of Fig. 2.

Fig. 4 is a detail on an enlarged scale of the mechanism for operating the belt.

Referring now to the drawings, at A is shown the frame of the machine. At 11 is shown a metal belt made of highly polished flexible metal, as for instance, sheet tin, which runs over drums 12, 12, one of which is mounted at each end of the machine. To each edge of the belt there is secured by lugs 13 an endless chain 14, 14 which runs over sprockets 15, 16, 17 and 18. At 19, 19 (see Fig. 3) are shown drums which rest against the under side of the belt 11 intermediate the drums 12 to support the belt in the horizontal stretches. These drums 19 are provided at each side with sprockets 9 which are engaged by the chains 14, 14 providing supports for the chains similar to the support afforded by the drums 19 for the belt, these parts also affording guiding means for chains and belt throughout the horizontal travel. For purposes of adjustment, the axle 20 of the sprocket wheels 15, 18 are mounted in boxes one of which is shown at 21 in Figure 1. The boxes are slidable longitudinally in slots in brackets on the frame of the machine. One of these brackets is shown at 22 in Figure 1, and has a slot 23 in which the box 21 is mounted. Screws 24 serve to position the boxes 21 in the slots 23.

At 25 is indicated the hopper of a chocolate depositor of well-known construction. This machine delivers melted chocolate in predetermined quantities simultaneously through a series of nozzles 26 arranged transversely of the machine and located closely adjacent the top surface of the upper run of the belt. The chocolate depositor is operated by means which causes the deposit of the chocolate for an entire row of buds, as shown at *b* in Figure 2, once during each operation of the depositing mechanism indicated at 27. The weight of the bud or piece is determined by regulating the depositor, but the diameter and height of the piece for any given weight is determined by the distance between the nozzle and the top surface of the upper run of the belt. If the belt is near the orifice of the nozzle when the chocolate is ejected, a relatively flat piece will be formed, while if the belt is at a distance from the nozzle, a relatively tall piece will be produced.

The operating mechanism for the movement of the belt in proper time and relation to the movement of the chocolate depositor will now be described. At 30 is shown a main driving pulley by which the machine is operated. This pulley is mounted on a shaft 31 on which is a gear 32 meshing with a gear 33. The gear 33 meshes with a gear 34 carrying a crank pin 35. The crank pin 35 is engaged by a pitman 36 which operates a slide 37 guided in a bracket 38 on the side of the machine. This slide in turn operates a second pitman 39 connected to a ratchet arm 40 on a shaft 41 on which are the end sprocket wheels 16 and 17. This axle also carries a ratchet wheel 42 which is engaged by a pawl 43 pivotally mounted on the upper end of the ratchet arm 40. A stop pawl 45 prevents backward movement of the ratchet wheel 42. It will, therefore, be seen that the rotation of the pulley 30 gives a step-by-step motion to the endless belt 11 and that the length of each movement may be varied by changing the position of the pivot pin 46 in a slot 47 in the ratchet arm 40, so that the pawl 43 will move over a greater or a less number of teeth according to the amount of movement desired.

As it is essential in the manufacture of articles of this kind that no string or thread of liquid chocolate be dragged from one row of buds to the next, and that the deposit of chocolate for the formation of each row of buds shall be neat and symmetrical, mechanism is provided by which when the deposit is being made, the belt or apron 11 shall be almost in contact with the orifices or nozzles 26 of the chocolate depositor, and that thereafter the nozzles and the belt shall be separated farther and the belt, while still at a distance from the depositor, shall be moved into the succeeding position ready for the next deposit to be made. To accomplish this and also to permit for the necessary adjustment to vary the size and shape of the piece produced, the following mechanism is provided:—

On the shaft 48 on which the gear 33 is mounted, are placed eccentrics 49 only one of which is shown in the drawings. (See Figs. 1 and 4.) These eccentrics raise and lower a plate 50 which is adjustably secured by bolts 51 to the under side of a support 52 across which the belt 11 travels. The support 52 is pivoted at 53 (see Fig. 1) to the frame of the machine, this pivot being at a considerable distance from plate 50. During the forward movement of the belt 11, the support 52 is in the position shown in Figures 1 and 4, so that there is the maximum distance between the upper surface of the belt and the lower ends of the nozzles. When the belt has moved forward by the step-by-step mechanism, the eccentrics 49 push the support 52 and apron 11 up toward the nozzles 26 of the chocolate depositor, and then after the deposit takes place, lower the apron away from the nozzles, the horizontal movement of the belt or apron taking place after the downward movement has occurred. By adjusting the position of the support 52 relatively to the plate 50 by means of the adjusting screws 51, the diameter of the piece relatively to its height may be varied as has been previously explained.

After leaving the chocolate depositor, the belt or apron 11 passes through a cooling chamber 60 through which cold air is blown, the air entering through pipe 61 and passing out through pipe 62. While I have shown a cooling chamber which surrounds only the belt and forms a part of the machine, it will be understood that I do not limit myself to this size or construction since, as is well known, the endless belt may be run into the ordinary cooling room such as is commonly employed in chocolate factories.

As the endless belt 11 emerges from the cooling chamber 60 and passes over the drum 12 at the end of the machine, the bending of the belt breaks the adhesion between the chocolate and the surface of the apron so that the buds or stars which are then completely cold and hard, fall off the apron through a chute 63 into boxes 64. The edge of the chute 63 rests against the apron and forms a doctor which removes from the apron any bud or star which has not been loosened by the bending of the apron.

What I claim is,—

1. In a machine of the character described, the combination of means for depositing plastic material in separated masses, and an endless travelling metallic belt having a polished receiving surface on which the depositor places the plastic material.

2. In a machine of the character described, the combination of means for depositing plastic material in separated masses, a travelling metallic belt having a polished receiving surface, and means for cooling the material after it has been deposited on the belt.

3. In a machine of the character described, the combination of means for depositing plastic material in separated masses, a travelling metallic belt having a polished receiving surface, and a cooling chamber through which passes the portion of the belt on which the material has been deposited.

4. In a machine of the character described, the combination of means for depositing in separated masses material which is plastic when warm and hard when cold, and an endless metal belt having a polished-receiving surface on which the plastic material is dropped while warm by the depositor.

5. In a machine of the character described, the combination of means for depositing in separated masses material which is plastic when warm and hard when cold, a metal belt having a polished-receiving surface on which the depositor drops the plastic material while warm, means for cooling the goods and belt after passing the depositor, and means for bending the belt after cooling to detach the goods from the belt.

6. In a machine of the character described, the combination of means for depositing in separated masses material which is plastic when warm and hard when cold, an endless metal belt having a polished receiving surface on which the depositor drops the plastic material while warm, means for cooling the goods and belt after passing the depositor and means for bending the belt after cooling to detach the goods from the belt.

7. In a machine of the character described, the combination of means for depositing in separated masses material which is plastic when warm and hard when cold, said depositor being adapted to make successive deposits of plastic material and having a plurality of transversely arranged orifices, an endless metal belt having a polished-receiving surface on which the depositor drops the warm plastic material in successive rows of deposits, means to give the belt a step-by-step motion after each deposit has been made, means for cooling the goods and belt after passing the depositor, and means for bending the belt after cooling to detach the goods from the belt.

8. In a machine of the character described, the combination of means for depositing in separated masses material which is plastic when warm and hard when cold, said depositor being adapted to make successive deposits of plastic material and having a plurality of transversely arranged orifices, an endless metal belt having a polished-receiving surface on which the depositor drops the warm plastic material in successive rows of deposits, means to give the belt a step-by-step motion after each deposit has been made, means to increase the distance between the depositor and the surface of the belt after each deposit has been made, means for cooling the goods and belt after passing the depositor and means for bending the belt after cooling to detach the goods from the belt.

In testimony whereof I affix my signature.

WILLIS N. HARTSHORN.